United States Patent
Koseoglu (10) Patent No.: US 8,956,528 B2
(45) Date of Patent: Feb. 17, 2015

(54) SLURRY BED HYDROPROCESSING AND SYSTEM USING FEEDSTOCK CONTAINING DISSOLVED HYDROGEN

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/683,695

(22) Filed: Nov. 21, 2012

(65) Prior Publication Data

US 2013/0126392 A1 May 23, 2013

Related U.S. Application Data

(60) Provisional application No. 61/562,311, filed on Nov. 21, 2011.

(51) Int. Cl.
    *C10G 47/26* (2006.01)
    *B01J 8/20* (2006.01)
    *C10G 65/10* (2006.01)

(52) U.S. Cl.
    CPC . *C10G 47/26* (2013.01); *B01J 8/20* (2013.01); *C10G 65/10* (2013.01)
    USPC ............. 208/108; 208/85; 208/113; 208/121

(58) Field of Classification Search
    USPC ............. 208/85, 108–113, 121; 261/19, 23.1, 261/38, 40, 42, 76, 78.1
    See application file for complete search history.

(56) References Cited

U.S. PATENT DOCUMENTS

| | | | |
|---|---|---|---|
| 2,968,614 A | 1/1961 | Brooks et al. |
| 3,152,981 A | 10/1964 | Berlin et al. |
| 3,240,718 A | 3/1966 | Gatsis |
| 4,303,634 A | 12/1981 | Gatsis |
| 4,470,295 A | 9/1984 | Pounds et al. |
| 4,666,588 A | 5/1987 | Murphy |
| 4,762,812 A | 8/1988 | Lopez et al. |
| 4,952,306 A | 8/1990 | Sawyer et al. |
| 4,968,409 A | 11/1990 | Smith |
| 5,094,991 A | 3/1992 | Lopez et al. |
| 5,288,681 A | 2/1994 | Gatsis |
| 5,298,152 A | 3/1994 | Kramer |

(Continued)

FOREIGN PATENT DOCUMENTS

WO 98/37168 A2 8/1998
WO 02/059235 A1 8/2002

OTHER PUBLICATIONS

Robinson et al., "Commercial Hydrotreating and Hydrocracking", Hydroprocessing of Heavy Oils and Residua, pp. 281-311 (Dec. 31, 2007).

(Continued)

*Primary Examiner* — Brian McCaig
(74) *Attorney, Agent, or Firm* — Abelman, Frayne & Schwab (57) ABSTRACT

A system and process for conversion of heavy feedstocks in a slurry bed hydroprocessing reactor is provided in which (a) hydrogen gas is dissolved in the liquid feedstock by mixing and/or diffusion, (b) the mixture is flashed to remove and recover any light components and hydrogen, leaving a hydrogen-enriched feedstock. A homogenous and/or heterogeneous catalyst is added to the feedstock upstream of the inlet of the slurry bed hydroprocessing reactor.

11 Claims, 4 Drawing Sheets

(56) References Cited

U.S. PATENT DOCUMENTS

| | | | |
|---|---|---|---|
| 5,624,642 | A | 4/1997 | Devanathan et al. |
| 5,871,635 | A | 2/1999 | Gupta et al. |
| 5,935,418 | A | 8/1999 | Chakrabarty et al. |
| 6,123,835 | A | 9/2000 | Ackerson et al. |
| 6,428,686 | B1 | 8/2002 | Ackerson et al. |
| 6,660,157 | B2 | 12/2003 | Que et al. |
| 6,712,955 | B1 | 3/2004 | Hou et al. |
| 6,881,326 | B2 | 4/2005 | Ackerson et al. |
| 7,291,257 | B2 | 11/2007 | Ackerson et al. |
| 7,390,398 | B2 | 6/2008 | Farshid et al. |
| 7,449,103 | B2 | 11/2008 | Lott et al. |
| 7,510,689 | B2 | 3/2009 | Costinel |
| 7,569,136 | B2 | 8/2009 | Ackerson et al. |
| 8,128,808 | B2 | 3/2012 | Hassan et al. |
| 2009/0000986 | A1* | 1/2009 | Hassan et al. ............. 208/108 |
| 2009/0057193 | A1 | 3/2009 | Farshid et al. |
| 2010/0294701 | A1 | 11/2010 | Lott et al. |
| 2010/0326882 | A1 | 12/2010 | McGehee et al. |
| 2011/0174686 | A1 | 7/2011 | Reynolds et al. |
| 2012/0103868 | A1 | 5/2012 | Dindi et al. |

OTHER PUBLICATIONS

Gillis et al., "Upgrading Residues to Maximinze Distillate Yields", UOP LLC, pp. 1-19 (Dec. 31, 2009).

Panariti et al., "Petroleum Residue Upgrading with Dispersed Catalysts: Part 1. Catalysts Activity and Selectivity", Applied Catalysis A: General, vol. 204, Issue 2, pp. 203-213 (Dec. 2000) (Abstract only).

International Search Report and Written Opinion in related international application PCT/US2012/066308 mailed Feb. 22, 2013.

* cited by examiner

SLURRY BED HYDROPROCESSING AND SYSTEM USING FEEDSTOCK CONTAINING DISSOLVED HYDROGEN

RELATED APPLICATIONS

This application claims priority from U.S. Provisional Patent Application No. 61/562,311 filed Nov. 21, 2011, incorporated by reference in its entirety.

BACKGROUND OF THE INVENTION

1. Field of the Invention

This invention relates to hydrocracking or hydroprocessing systems and processes that employ slurry bed reactors.

2. Description of Related Art

In a typical refinery, crude oil is initially introduced to an atmospheric distillation column or a crude tower where it is separated into a variety of different components including naphtha boiling in the range of from 36° C. to 180° C., diesel boiling in the range of from 180° C. to 370° C., and atmospheric bottoms boiling above 370° C. The atmospheric bottoms, or residue, is further processed in a vacuum distillation column where it is separated into a vacuum gas oil (VGO) boiling in the range of from 370° C. to 520° C. and a heavy vacuum residue boiling above 520° C. The VGO can be further processed by hydrocracking to produce naphtha and diesel, or by fluid catalytic cracking (FCC) to produce gasoline and cycle oils. The heavy vacuum residue can be treated to remove unwanted impurities or converted into useful hydrocarbon products.

Common objectives of hydrocracking or hydroprocessing operations are to remove impurities such as sulfur, nitrogen and/or metals (particularly those in residue feedstocks), and cracking the relatively heavy hydrocarbon feedstock into relatively light hydrocarbons to obtain transportation fuels such as gasoline and diesel. The reactions that occur in hydrocracking/hydroprocessing operations include hydrodesulfurization (HDS), carbon residue reduction (CRR), hydrodenitrogenation (HDN), and cracking.

Generally, hydrocracking/hydroprocessing reactions occur under operating conditions that include a temperature in the range of about 350-440° C., a pressure in the range of about 30-200 Kg/cm$^2$, a liquid hourly space velocity in the range of about 0.1-10, and a hydrogen to oil ratio in the range of about 300-3000 liters/liters.

Hydrocracking/hydroprocessing is typically conducted in the presence of a catalyst containing group VI or VIII metals such as platinum, molybdenum, tungsten, nickel, cobalt, etc., in combination with various other porous particles of alumina, silica, magnesia and the like having a high surface-to-volume ratio. The catalysts utilized for hydrodemetallization, hydrodesulfurization, hydrodenitrification, and hydrocracking of heavy feedstocks include a carrier or base material, such as alumina, silica, silica-alumina, or crystalline aluminosilicate, with one more catalytically active metals or other compounds. Typical catalytically active metals utilized include cobalt, molybdenum, nickel and tungsten; however, other metals or compounds can be used depending on the application.

To maximize refinery efficiency, downtime for replacement or regeneration of catalysts should be minimized. Furthermore, process economics generally require a versatile system capable of handling feed streams containing various types and quantities of contaminants including sulfur, nitrogen, metals and/or organometallic compounds, such as those found in VGO, deasphalted oils and residues.

There are three principal types of reactors used in the refining industry: fixed bed, ebullated bed and moving bed. In a fixed bed reactor, catalyst particles are stationary and do not move with respect to a fixed reference frame. Fixed-bed technologies are less suitable for treating relatively heavy feedstocks, particularly those containing high percentages of heteroatoms, metals, and asphaltenes, since these contaminants cause the rapid deactivation of the catalyst and subsequent plugging of the reactor. Multiple fixed-bed reactors connected in series can be used to achieve a relatively high conversion of heavy feedstocks boiling above 370° C., but such designs are costly to install and operate, and for certain feedstocks, commercially impractical, e.g., catalysts must be replaced every 3 to 4 months.

Ebullated bed reactors generally overcome the plugging problems associated with fixed bed reactors for processing heavier feedstocks at increased conversions. In an ebullated bed reactor, the catalyst is in an ebullated state. The fluidized nature of the catalyst also allows for on-line catalyst replacement of a small portion of the bed which results in a high net bed activity that remains relatively constant over time.

Moving bed reactors combine certain advantages of fixed bed operations and the relatively easy catalyst replacement of ebullated bed technology. Operating conditions are generally more severe than those typically used in fixed bed reactor, i.e., the pressure can exceed 200 Kg/cm2, and the temperature can be in the range of from 400-430° C. During catalyst replacement, catalyst movement is slow compared to the linear velocity of the feed. Catalyst addition and withdrawal are performed, for instance, via a sluice system at the top and bottom of the reactor. The advantage of the moving bed reactor is that the top layer of the moving bed consists of fresh catalyst, and contaminants deposited on the top of the bed move downward with the catalyst and are released during catalyst withdrawal at the bottom. The tolerance to metals and other contaminants is therefore much greater than in a fixed bed reactor. With this capability, the moving bed reactor has advantages for hydroprocessing of very heavy feeds, especially when several reactors are combined in series.

The decision to use a particular type of reactor is based on a number of criteria including the type of feedstock, desired conversion percentage, flexibility, run length and product quality, among others. In a refinery, the down-time for replacement or renewal of catalyst must be as short as possible. Further, the economics of the process will generally depend upon the versatility of the system to handle feed streams containing varying amounts of contaminants such as sulfur, nitrogen, metals and/or organometallic compounds, such as those found in VGO, DAO, and residues.

Slurry bed reactor technology is another type of system that is under development. Slurry bed reactor technology is characterized by the presence of catalyst particles having very small average dimensions that can be efficiently dispersed uniformly and maintained in the medium, so that the hydrogenation processes are efficient and immediate throughout the volume of the reactor. Slurry phase hydroprocessing operates at relatively high temperatures (450° C.-500° C.) and high pressures (150 bars-230 bars). Because of the high severity of the process, a relatively higher conversion rate can be achieved. The catalysts can be homogeneous or heterogeneous that are functional at high severity conditions. The mechanism is a thermal cracking process and is based on free radical formation. The free radicals formed are stabilized with hydrogen in the presence of catalysts, thereby preventing the coke formation. The catalysts facilitate the partial hydrogenation of heavy feedstock prior to cracking and thereby reduce the formation of longer chain compounds.

The catalysts used in slurry hydrocracking processes can be small particles or can be introduced as an oil soluble precursor, generally in the form of a sulfide of the metal that is formed during the reaction or in a pretreatment step. The metals that make up the dispersed catalysts are generally one or more transition metals, which can be selected from Mo, W, Ni, Co and/or Ru. Molybdenum and tungsten are especially preferred since their performance is superior to vanadium or iron, which in turn are preferred over nickel, cobalt or ruthenium. The catalysts can be used at a low concentration, e.g., a few hundred parts per million (ppm), in a once-through arrangement, but are not especially effective in upgrading of the heavier products under those conditions. To obtain better product quality, catalysts are used at higher concentration, and it is necessary to recycle the catalyst in order to make the process economically feasible. The catalysts can be recovered using methods such as settling, centrifugation or filtration.

In general, a slurry bed reactor can be a two-or-three phase reactor, depending on the type of catalysts utilized. A two-phase system includes gas and liquid when homogeneous catalysts are employed, and a three-phase system includes gas, liquid and solid when small particle size heterogeneous catalysts are employed. The soluble liquid precursor or small particle size catalysts permit high dispersion of catalysts in the liquid resulting in intimate contact between catalyst and feedstock, thus maximizing the conversion rate. However, substantial amounts of hydrogen gas customarily present in conventional slurry bed reactors is known to cause problems such as gas hold-up and inefficient use of reactor space. The presence of hydrogen gas also reduces the liquid residence time in the reactor and limits the hydrogen partial pressure.

Although there are numerous types of slurry bed reactor designs, it would be desirable to have a more efficient and effective slurry bed reactor system and process with improved reactor performance in order to produce products of enhanced quality at less expense than is possible using current methods and systems.

SUMMARY OF THE INVENTION

The system and process herein is for conversion of liquid hydrocarbon feedstocks into lower molecular weight hydrocarbon compounds in a slurry bed reactor. The process comprises:

a. mixing the liquid hydrocarbon feedstock and an excess of hydrogen gas in a mixing/distribution zone under predetermined conditions of temperature and hydrogen partial pressure to dissolve a portion of the hydrogen gas in the liquid hydrocarbon feedstock to produce a mixture of hydrogen-enriched liquid hydrocarbon feedstock and undissolved hydrogen gas;

b. introducing said mixture into a flashing zone under predetermined conditions to separate undissolved hydrogen gas and light hydrocarbon components and recovering a hydrogen-enriched liquid hydrocarbon feedstock;

c. introducing the hydrogen-enriched liquid hydrocarbon feedstock from the flashing zone into a reaction zone containing at least one slurry bed reactor with at least one catalyst or catalyst precursor and reacting the feedstock to convert at least a portion of the feedstock into lower boiling point hydrocarbons;

d. recovering a reactor effluent from the at least one slurry bed reactor comprising converted hydrocarbon products and unconverted liquid feedstock;

e. introducing the reactor effluent from the at least one slurry bed reactor into a separation zone to separate converted hydrocarbon products from unconverted liquid feedstock; and f. recovering the converted hydrocarbon products from the separation zone; and g. recovering the unconverted liquid feedstock from the separation zone and recycling at least a portion of the unconverted liquid feedstock to the at least one slurry bed reactor inlet.

In an embodiment, at least a portion of the treated and unconverted liquid feedstock that is recovered from the slurry bed reactor is recycled to form a portion of the liquid hydrocarbon feedstock.

In further embodiments, the hydrocracking zone includes a plurality of reactors, e.g., from two to six reactors, and in certain embodiments from two to four reactors.

In additional embodiments of the invention, an interstage separator is positioned to receive and process the unconverted feedstock stream between at least two of the reactors and preferably between each pair of adjacent reactors, e.g., in which three or more reactors are arranged in series.

In another embodiment, a hydrogen mixing/distribution zone and flashing zone are positioned after at least one of the reactors, and preferably between each pair of reactors, where two or more reactors are arranged in series.

In an embodiment in which there is only one reactor, a portion of the liquid product stream from the reactor is recycled and mixed with fresh feedstock for adsorption of hydrogen gas, flashing and subsequent introduction into the reactor.

In an embodiment in which there are a plurality of reactors, a portion of the treated and unconverted liquid feedstock from one or more of the reactors is recycled and mixed either with fresh or treated and unconverted feedstock for eventual hydrogen saturation and subsequent introduction to the same or an upstream reactor, to thereby supplement the amount of dissolved hydrogen in the feedstock entering the one or more downstream reactors.

It is an object of the process and system herein to overcome problems encountered in typical slurry bed hydroprocessing reactors associated with gas hold-up in the reactor, those associated with the presence of gas in the reactor effluent and bottoms stream, and to reduce overall reactor size requirements.

Other aspects, embodiments, and advantages of the process of the present invention are discussed in detail below. Moreover, it is to be understood that both the foregoing information and the following detailed description are merely illustrative examples of various aspects and embodiments, that are intended to provide an overview or framework for understanding the nature and character of the claimed invention. The accompanying drawings provide schematic illustrations of representative process steps to facilitate an understanding of the various aspects and embodiments of the invention. The drawings, together with the remainder of the specification, serve to explain principles and operations of the described and claimed aspects and embodiments of the present invention.

BRIEF DESCRIPTION OF THE DRAWINGS

The invention will be described in further detail below and with reference to the attached drawings in which.

DETAILED DESCRIPTION OF THE INVENTION

In accordance with the process of the invention, all or a substantial portion of the hydrogen required for hydroprocessing/hydrocracking reactions is dissolved in the liquid feedstock upstream of the slurry bed reactor in a hydrogen mixing zone. In one embodiment, a hydrogen distribution vessel upstream of the slurry bed reactor receives hydrogen, fresh feedstock and, optionally, recycled product that has passed through a reactor, and the liquid is saturated under predetermined conditions of pressure and temperature to dissolve at least a substantial portion of the requisite hydrogen gas into the liquid feedstock to produce a combined liquid feed/dissolved hydrogen stream as the slurry bed reactor influent.

Gas phase hydrogen is eliminated or substantially minimized by dissolving the hydrogen in the liquid hydrocarbon feedstock and flashing the feedstock under predetermined conditions upstream of the slurry bed hydroprocessing unit to produce a single reactant phase of liquid hydrocarbon feedstock containing dissolved hydrogen, preferably at the saturation level at the prevailing temperature and pressure. The slurry bed system, therefore, operates as a single-phase system of liquid having requisite hydrogen gas dissolved therein when one or more homogeneous liquid catalysts are employed, or as a two-phase system of liquid having requisite hydrogen gas dissolved therein and solid components when one or more small particle size heterogeneous solid catalysts are employed.

For the purpose of this simplified schematic illustrations and description, the numerous valves, pumps, temperature sensors, electronic controllers and the like that are customarily employed in refinery operations and that are well known to those of ordinary skill in the art are not shown.

Figure 1:
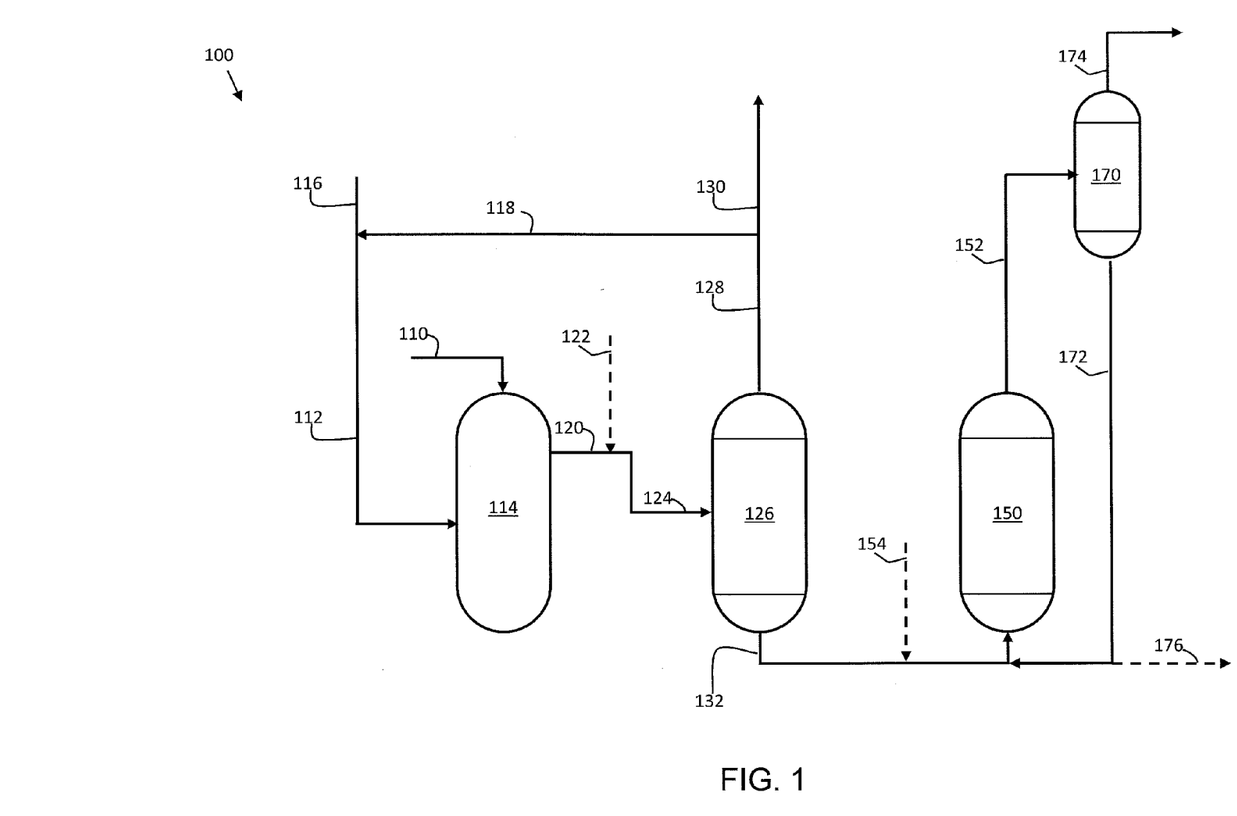
FIG. 1 is a schematic diagram of a system incorporating dissolved hydrogen in a slurry bed hydroprocessing feedstock.

FIG. 1 is a process flow diagram of a slurry hydroprocessing process described herein that includes a hydrogen-enriched feedstock. In general, system 100 includes:

a mixing/distribution zone 114 (referred to herein as the mixing zone) having at least one inlet for receiving a liquid hydrocarbon feedstock stream 110 and at least one inlet for receiving a hydrogen gas stream 112 (or alternatively a combined inlet for receiving both the feedstock and hydrogen gas), and an outlet for discharging a combined stream 120;

a flashing zone 126 having an inlet in fluid communication with the outlet discharging combined stream 120, a gas outlet 128 in fluid communication with one or more hydrogen gas inlets of the mixing/distribution 114, and an outlet for discharging hydrogen-enriched feedstock 132;

a slurry bed reaction zone 150 having an inlet in fluid communication with the hydrogen-enriched feedstock outlet of flashing zone 126 and an outlet 152; and a separation zone 170 having an inlet in fluid communication with the outlet 152 of the slurry bed reaction zone 150, an outlet for discharging bottoms 172 for recycling through the system 100 and a product outlet for discharging light gases and liquid products 174.

During operation of system 100, liquid hydrocarbon feedstock stream 110 is intimately mixed with the hydrogen gas stream 112 in mixing/distribution 114 to dissolve a predetermined quantity of hydrogen gas in the liquid mixture and produce a hydrogen-enriched liquid hydrocarbon feedstock. The hydrogen gas stream 112 includes fresh hydrogen introduced via stream 116 and recycled hydrogen introduced via stream 118 from the flashing zone 126. Combined stream 120, which includes hydrogen-enriched feedstock and the remaining excess hydrogen gas, is optionally combined with catalyst 122. The combined stream 124 is conveyed to the flashing zone 126 in which the undissolved hydrogen and other gases (e.g., light feedstock fractions) are flashed off and removed as stream 128.

A portion 118 of stream 128 is recycled and mixed with the fresh hydrogen feed 116. The amount of recycled hydrogen in the hydrogen gas stream 112 generally depends upon a variety of factors relating to the excess undissolved hydrogen recovered from the flashing zone 126. The remaining portion of the flashed gases are discharged from the system as a bleed stream 130.

Figure 2A:
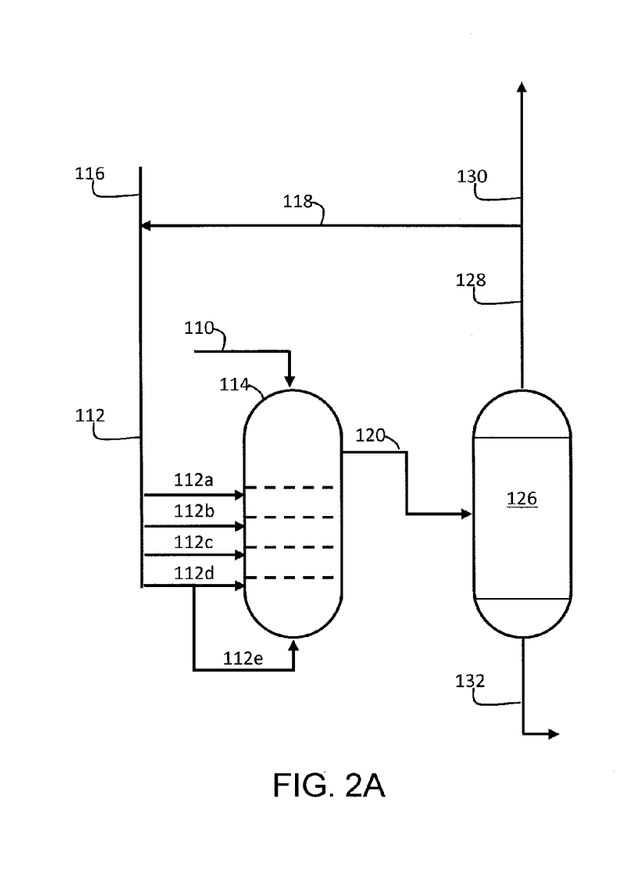
FIG. 2A a schematic diagram of a hydrogen dissolving system compatible with the method and apparatus of FIG. 1
Figure 2B:
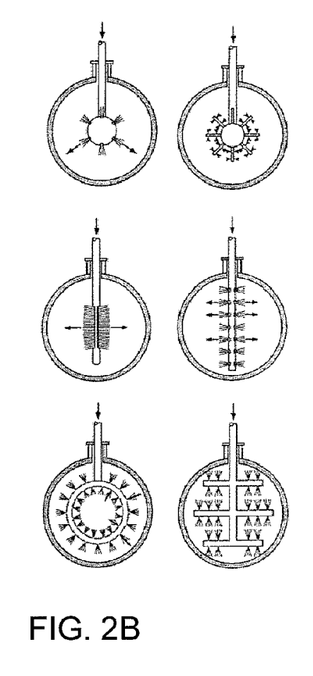
FIG. 2B shows gas distributors.

The mixing/distribution zone 114 described in FIG. 1 can be any apparatus that achieves the necessary intimate mixing of the liquid and gas so that sufficient hydrogen is dissolved in the liquid hydrocarbon feedstock. In other embodiments, the mixing zone can include a combined inlet for the hydrogen and the feedstock. Effective unit operations include one or more gas-liquid distributor vessels, which apparatus can include spargers, injection nozzles, or other devices that impart sufficient velocity to inject the hydrogen gas into the liquid hydrocarbon with turbulent mixing and thereby promote hydrogen saturation. Suitable apparatus are described with respect to FIG. 2 herein, and also, for instance, in U.S. Pat. Nos. 3,378,349; 3,598,541; 3,880,961; 4,960,571; 5,158,714; 5,484,578; 5,837,208; and 5,942,197, the relevant portions of which are incorporated herein by reference.

The hydrogen-enriched hydrocarbon feedstock, stream 132 which contains a predetermined quantity of dissolved hydrogen, preferably at the saturation level, is optionally combined with catalyst 154 and a recycle stream 172 (bottoms from separation zone 170). The combined stream is introduced into the slurry bed reaction zone 150.

As is explained below, and as will be understood by a person having ordinary skill in the art, the point of addition of catalyst to the feedstock can vary within the integrated system 100. It will also be understood that after start-up of the integrated system 100, the recycle stream 172 of treated and unconverted liquid feedstock will contain catalyst that is mixed with fresh feedstock entering the system. Accordingly the need for additional catalyst can be minimized or obviated.

The reactor effluent stream 152 from the slurry bed reaction zone 150 is introduced into separation zone 170. The light gases and liquid products stream 174 is recovered from the separation zone and at least a portion of bottoms 172 are recycled. Optionally a portion 176 of bottoms is purged from the system 100. Separation zone 170 is illustrated as a singular unit for simplicity. However in certain embodiments separation zone 170 can include a plurality of separation vessels typically found in hydroprocessing systems, such as high pressure separation vessels, low pressure separation vessels, distillation vessels, flash vessels and/or stripping vessels.

Gas and liquid hold-up rates are important process parameters that can contribute to performance of the system. High gas hold-up rates result in decreased liquid residence time which lowers process performance. Minimizing gas hold-up by dissolving a substantial portion of the requisite reaction hydrogen gas in the liquid feedstock according to the process and system described herein, to thereby produce a combined liquid phase feedstock, is one of the principal advantages of the integrated system and process described herein. In addition problems encountered in typical slurry bed hydroprocessing reactors associated with a reduction in efficiency of the recycle pump due to the presence of gas in the recycle stream are minimized or obviated using the integrated system and process described herein.

In certain embodiments, such as, for example, shown in FIG. 2A, a column is used as a hydrogen distributor vessel 114, in which hydrogen gas 112 is injected at plural locations 112a, 112b, 112c, 112d and 112e. Hydrogen gas is injected through hydrogen distributors into the column for adequate mixing to effectively dissolve hydrogen in the feedstock. For instance, suitable injection nozzles can be provided proximate several plates (locations 112a-112d) and also at the bottom of the column (location 112e). The liquid feedstock 110 can be fed from the top of the column as shown in the figure or from the bottom of the column (not shown).

Various types of hydrogen distributor apparatus can be used. For instance, referring to FIG. 2B, gas distributors can include tubular injectors fitted with nozzles and/or jets that are configured to uniformly distribute hydrogen gas into the flowing hydrocarbon feedstock in a column or vessel in order to achieve a saturation state in the mixing zone.

Operating conditions in the mixing zone are selected to increase the solubility of the hydrogen gas within the liquid hydrocarbon mixture. The mixing zone is maintained at pressure levels of from about 5 bars to about 200 bars in certain embodiments, and at a ratio of the normalized volume of hydrogen to the volume of liquid hydrocarbon of about 300 to about 3000 normalized liters of hydrogen per liter of liquid hydrocarbon.

The flashing zone 122 can include one or more flash drums that are maintained at suitable operating conditions to maintain a predetermined amount of hydrogen gas in solution in the liquid hydrocarbon.

It is to be understood that the location of the addition of the catalyst is to be completed upstream of the slurry reactor and that mixing can be achieved by any convenient apparatus and method know to the art, such as a separate mixing vessel equipment with a stirrer, an injector and/or an in-line mixer. The type of mixer selected generally depends on whether solid heterogeneous or liquid homogenous catalyst is utilized.

Figure 3:
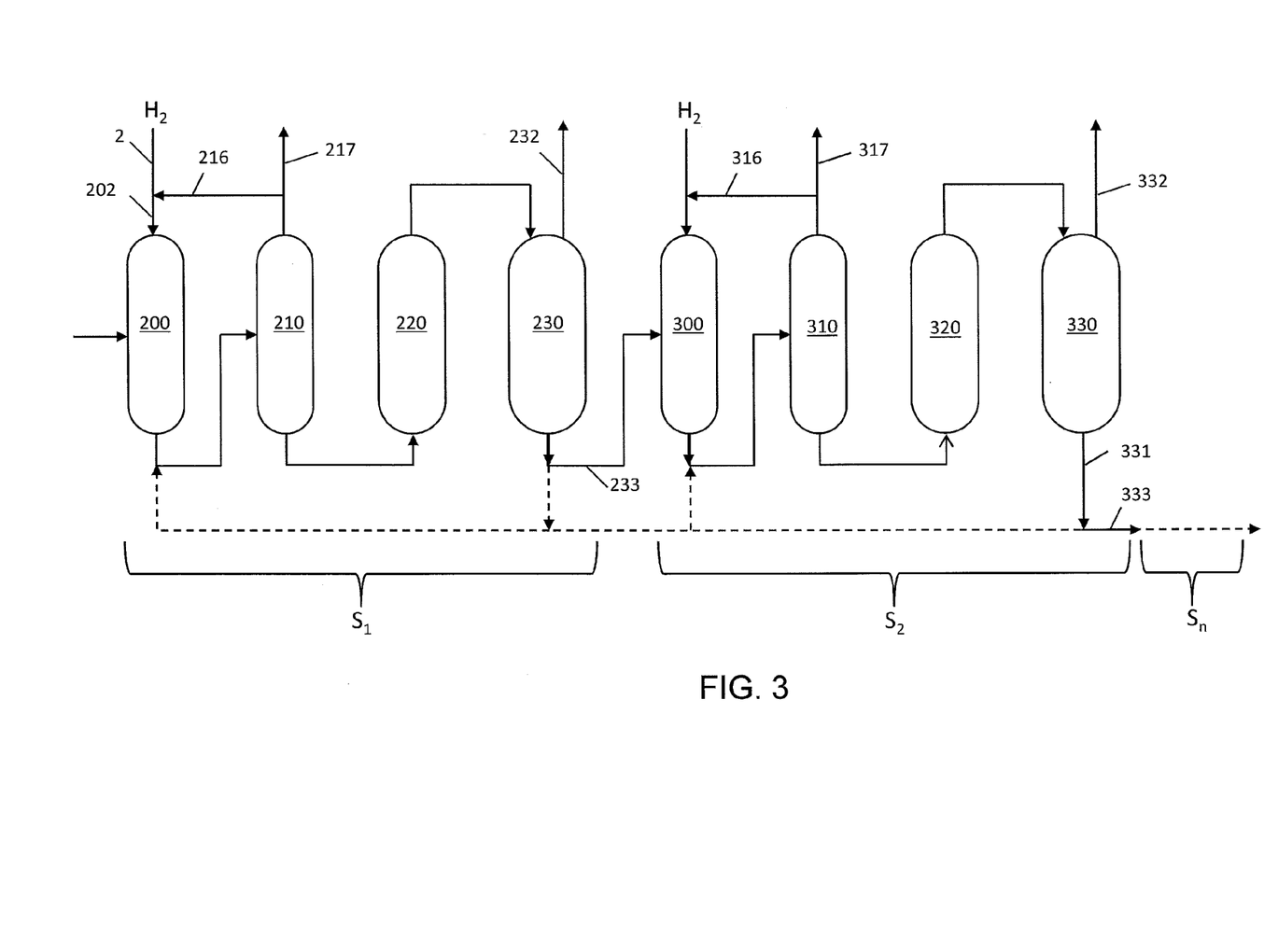
FIG. 3 is a schematic diagram of a series of slurry bed reactor systems.

Referring now to FIG. 3, a series of slurry bed reactor systems $S_1, S_2 \ldots S_n$ are shown, each system S comprising a mixing zone, a flash zone, a reaction zone and a separation zone. Representative reactor system $S_1$ includes a mixing zone 200 for dissolving hydrogen make-up stream 2 and recycled hydrogen stream 216 as combined stream 202 with fresh feedstock 1 and an optional recycle stream of treated and unconverted feedstock from one or more upstream reactors 220, 320, etc. Reactor system $S_1$ includes flashing zone 210 and slurry bed reaction zone 220 which function substantially the same as the system described in conjunction with FIGS. 1 and 2. The effluent from reaction zone 220 is introduced into separation zone 230 from which lower boiling hydrocarbon products 232 are recovered and the higher boiling treated and unconverted liquid hydrocarbon feedstock 233 are produced.

As will be understood from the illustration of system $S_2$ in FIG. 3, all or a portion of stream 233 used as the feedstock for system $S_3$ which generally includes the same type of unit operations that are identified by the corresponding 300 series of numbers. Additional reaction systems identified generally as $S_n$ can be included in the series. In each case, a portion of the treated and unconverted feedstock recovered from the separator, e.g., 331, can be recycled to one or more of the upstream mixing zones, e.g., 200, 300, for further hydrotreating. It will also be understood that a portion of the gases recovered from the flash units, e.g., 210, 310, containing a substantial proportion of hydrogen is recycled to one or more of the mixing zones in the series.

As will also be understood from the above description, fresh catalyst can be added, as required, at one or more locations upstream of one or more of the reactors in the series, which for simplicity have not be included in the illustration of FIG. 3. The use of a series of reactors, e.g., from two to four or six reactors, will greatly improve the recovery of lighter, more valuable hydrocarbons from heavy feedstocks in a system that permits easy replenishment of catalyst without taking any of the reactors out of service and interrupting production.

The feedstock for the system described herein includes heavy hydrocarbon liquid residue feedstock with high metal concentration and high Conradson Carbon Residue. The feedstock has normally boiling point above 370° C., in certain embodiment above 520° C.

In general, the operating conditions for the hydrocracking zone includes a pressure in the range of from 50-300 Kg/cm$^2$, in certain embodiments 100-250 Kg/cm$^2$, and in further embodiments 150-200 Kg/cm$^2$; a temperature in the range of from 350° C.-550° C., in certain embodiments from 450° C.-500° C.; a hydrogen feed at rates of up to about 5000 standard cubic feet per barrel (SCFB), in certain embodiments 500-5000 SCFB, and in further embodiments 1500-3000 SCFB; a liquid recycle-to-feed oil ratio in the range of from 1:1-1:10; and a liquid space velocity in the range of from 0.2-2.0 volume of feed per hour per volume of reactor (V/h/V).

The hydrocracking catalyst can include a soluble organic precursor or heterogeneous particles. The soluble organic precursor can include metal complexes or precursors (i.e., Mo, W, Ni, Co or Ru). In the case of heterogeneous catalysts, the support materials can be oxides of iron, coal, activated carbon, alumina, silica-alumina, and other known materials. The support material can be nano-sized particles (i.e., from 1 to 5000 nanometers) or particles as large as 3 mm in size. The concentration of catalyst is in the range of from 10-10,000 ppmw of feedstock.

Figure 4:
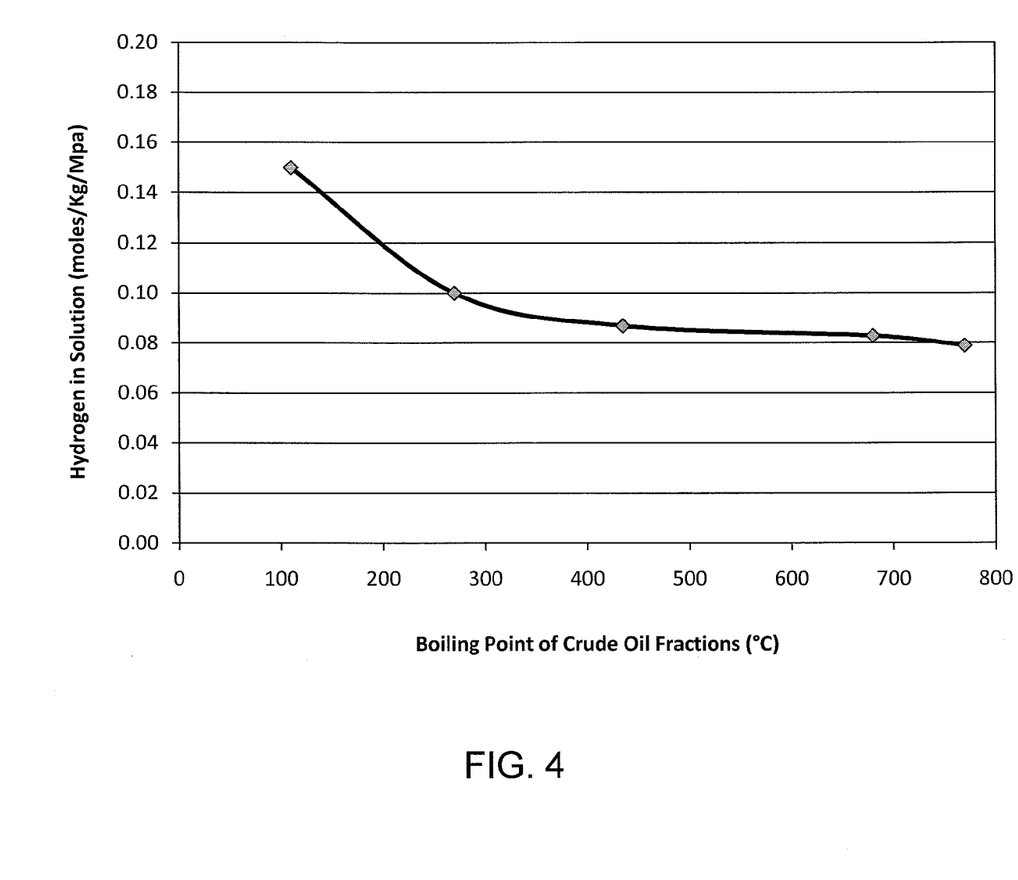
FIG. 4 is a graphic plot of hydrogen solubility in hydrocarbons versus the boiling point of crude oil fractions.

Using the mixing zone and flashing zone described herein, a functionally effective amount of hydrogen can be dissolved in the liquid hydrocarbon feedstock. The amount of hydrogen dissolved in the feedstock depends on various factors, including the operating conditions of the mixing zone and the flashing zone, and the boiling point of the feed. As shown by the solubility data in the graphic plot of FIG. 4, hydrogen is more soluble in the lower boiling point, relatively lighter hydrocarbon fractions than in the heavier fractions.

According to the process and system described herein, by using a hydrogen-enriched hydrocarbon feedstock which contains all or at least a substantial portion of the requisite hydrogen for hydroprocessing reactions as the feed through the slurry bed reactor, problems associated with excess gas in the system are alleviated. For example, since excess hydrogen gas in the system is minimized or substantially eliminated, the reactor effluent stream and the bottom stream have a reduced gas phase compared to conventional slurry bed hydroprocessing systems, which will increase the efficiency and minimize the size and/or complexity of downstream separation equipment, for instance, when the bottoms or reactor effluent serves as a recycle stream. The reduced levels of excess hydrogen also minimize the likelihood of gas hold-up, and the reactor volume can be used more effectively. A further advantage is that the reactor design can be simplified and therefore made more cost effective by eliminating or significantly reducing the gas phase.

Example

A vacuum residue derived from Arabian heavy crude oil, the specification of which is given below in Table 1, was hydrocracked in a slurry bed hydrocracking reactor unit at 420° C., 200 bars of hydrogen partial pressure, while passing 0.2 liters of oil per liter of reactor volume. The hydrogen was dissolved in the mixture of fresh feedstock and recycle oil from the reactor. The ratio of recycle oil to the fresh feedstock was 4.5:1.

TABLE 1

Vacuum Residue Feedstock

| Properties | Units | Values |
| --- | --- | --- |
| Specific Gravity | (g/cm3) | 1.0312 |
| API | gravity | 5.7 |
| 500° C.+ Content | W % | 96 |
| S | W % | 5.28 |
| N | W % | 0.45 |
| Ni/V | ppmw | 52/170 |
| n-$C_7$ asphaltenes | W % | 19.5 |
| CCR | W % | 22.9 |

TABLE 2

| Product | Yields | W % |
| --- | --- | --- |
| Gas | $C_1$-$C_4$ + $H_2$S | 8.7 |
| Naphtha | $C_5$-180° C. | 0.9 |
| Gasoil | 180-370° C. | 26.2 |
| Vacuum Gasoil | 370-520° C. | 30.5 |
| Unconverted Vacuum Residue | 520° C.+ | 15.1 |
| Pitch | 500° C.+ | 20.2 |
| Total | | 101.6 |

As shown in Table 2, the total conversion of the hydrocarbons boiling above 500° C. was 85 W % and 82 W % of hydrodesulfurization was achieved in the process. In this example, the hydrogen dissolved in the feedstock was sufficient to support the once-through reaction and no separate gas phase hydrogen was added to the slurry bed reactor. This represents a reduction of 30-40 percent in the design capacity or volume of the reactor that would be required to accommodate the gas hold-up in a reactor operating with a three-phase system.

The method and system of the present invention have been described above and in the attached drawings; however, modifications will be apparent to those of ordinary skill in the art and the scope of protection for the invention is to be defined by the claims that follow.

The invention claimed is:

1. A process for converting a liquid hydrocarbon feedstock into lower molecular weight hydrocarbon compounds in a slurry bed reactor, the process comprising:
   a. mixing the liquid hydrocarbon feedstock and an excess of hydrogen gas in a mixing zone under predetermined conditions of temperature and hydrogen partial pressure to dissolve a portion of the hydrogen gas in the liquid hydrocarbon feedstock to produce a mixture of hydrogen-enriched liquid hydrocarbon feedstock and undissolved hydrogen gas;
   b. introducing the mixture produced in step (a) into a flashing zone under predetermined conditions to separate undissolved hydrogen gas and light hydrocarbon components and recovering a hydrogen-enriched liquid hydrocarbon feedstock;
   c. introducing the hydrogen-enriched liquid hydrocarbon feedstock into a reaction zone containing at least one slurry bed reactor with at least one catalyst or catalyst precursor and reacting the feedstock to convert at least a portion of the feedstock into lower boiling point hydrocarbons;
   d. recovering a reactor effluent from the at least one slurry bed reactor comprising converted hydrocarbon products and unconverted liquid feedstock;
   e. introducing the reactor effluent from the at least one slurry bed reactor into a separation zone to separate converted hydrocarbon products from unconverted liquid feedstock;
   f. recovering the converted hydrocarbon products from the separation zone; and
   g. recovering the unconverted liquid feedstock from the separation zone.

2. The process of claim 1 in which at least a portion of unconverted liquid feedstock is recovered from the separation zone and is recycled to the reaction zone to form a portion of the hydrogen-enriched liquid hydrocarbon feedstock.

3. The process of claim 1 in which the at least one catalyst is selected from a liquid homogeneous catalyst precursor and a particulate heterogeneous catalyst with a particle size ranging from 1 nm to 3 mm.

4. The process of claim 1 in which fresh catalyst is added to the unconverted liquid feedstock upstream of one or more of the at least one reactors.

5. The process of claim 1 in which the reaction zone includes a plurality of slurry bed reactors arranged in series, each reactor optionally preceded by a hydrogen mixing zone in which hydrogen is added to the unconverted liquid feedstock and a flashing zone from which light components and hydrogen are recovered prior to introduction of the unconverted feedstock into a downstream reactor.

6. The process of claim 5 in which fresh catalyst is added to the unconverted liquid feedstock upstream of one or more of the at least one reactors.

7. The process of claim 6 which is continuous and in which fresh catalyst is added to the feedstock without interrupting the process.

8. The process of claim 1 in which a portion of the catalyst is removed from the unconverted liquid feedstock recycle stream.

9. A slurry bed reactor system comprising:
   a. a mixing zone having an inlet in fluid communication with a source of hydrogen and a source of liquid feedstock constructed and arranged to operate under predetermined conditions of temperature and hydrogen partial pressure to dissolve a portion of the hydrogen gas in the liquid hydrocarbon feedstock to produce a mixture of hydrogen-enriched liquid hydrocarbon feedstock and undissolved hydrogen gas that is discharged via a mixing zone outlet;
   b. a flashing zone in fluid communication with the mixing zone outlet constructed and arranged to operate under predetermined conditions to separate and discharge undissolved hydrogen gas and light hydrocarbon components from a gas outlet and a hydrogen-enriched liquid hydrocarbon feedstock from a liquid outlet;

c. a reaction zone having at least one slurry bed reactor inlet in fluid communication with the flashing zone liquid outlet and constructed and arranged for receiving at least one catalyst or catalyst precursor and for reacting the feedstock to convert at least a portion of the feedstock into lower boiling point hydrocarbons, a reaction zone effluent outlet for discharging a reactor effluent comprising converted hydrocarbon products and unconverted liquid feedstock;

d. a separation zone having, an inlet in fluid communication with the reaction zone effluent outlet constructed and arranged to operate under predetermined conditions to separate and discharge converted hydrocarbon products from a tops product outlet and unconverted liquid feedstock from a bottoms outlet.

10. The system as in claim 9 wherein the bottoms outlet is in fluid communication with the reactor inlet.

11. A slurry bed reactor system comprising:

a. a first slurry bed reactor subsystem having a mixing zone having an inlet in fluid communication with a source of hydrogen and a source of liquid feedstock constructed and arranged to operate under predetermined conditions of temperature and hydrogen partial pressure to dissolve a portion of the hydrogen gas in the liquid hydrocarbon feedstock to produce a mixture of hydrogen-enriched liquid hydrocarbon feedstock and undissolved hydrogen gas that is discharged via a mixing zone outlet;

a flashing zone in fluid communication with the mixing zone outlet constructed and arranged to operate under predetermined conditions to separate and discharge undissolved hydrogen gas and light hydrocarbon components from a gas outlet and a hydrogen-enriched liquid hydrocarbon feedstock from a liquid outlet;

a reaction zone having at least one slurry bed reactor inlet in fluid communication with the liquid outlet and constructed and arranged for receiving at least one catalyst or catalyst precursor and for reacting the feedstock to convert at least a portion of the feedstock into lower boiling point hydrocarbons, a reaction zone effluent outlet for discharging a reactor effluent comprising converted hydrocarbon products and unconverted liquid feedstock; and a separation zone having an inlet in fluid communication with the reaction zone effluent outlet constructed and arranged to operate under predetermined conditions to separate and discharge converted hydrocarbon products from a tops product outlet and unconverted liquid feedstock from a bottoms outlet;

b. a second slurry bed reactor subsystem having a mixing zone having an inlet in fluid communication with a source of hydrogen and the bottoms outlet of the first slurry bed reactor subsystem constructed and arranged to operate under predetermined conditions of temperature and hydrogen partial pressure to dissolve a portion of the hydrogen gas in the unconverted hydrocarbons from the bottoms outlet of the first slurry bed reactor subsystem to produce a mixture of hydrogen-enriched hydrocarbon and undissolved hydrogen gas that is discharged via a mixing zone outlet;

a flashing zone in fluid communication with the mixing zone outlet constructed and arranged to operate under predetermined conditions to separate and discharge undissolved hydrogen gas and light hydrocarbon components from a gas outlet and a hydrogen-enriched liquid hydrocarbon from a liquid outlet;

a reaction zone having at least one slurry bed reactor inlet in fluid communication with the liquid outlet and constructed and arranged for receiving at least one catalyst or catalyst precursor and for reacting the feedstock to convert at least a portion of the feedstock into lower boiling point hydrocarbons, a reaction zone effluent outlet for discharging a reactor effluent comprising converted hydrocarbon products and unconverted liquid feedstock; and a separation zone having an inlet in fluid communication with the reaction zone effluent outlet constructed and arranged to operate under conditions to separate and discharge converted hydrocarbon products from a tops product outlet and unconverted liquid feedstock from a bottoms outlet.

* * * * *